3,737,456
**NOVEL PROCESS FOR THE PRODUCTION OF
1-CHLORO-3-PHOSPHOLENES**
Curtis P. Smith, Cheshire, and Henri Ulrich, North Branford, Conn., assignors to The Upjohn Company, Kalamazoo, Mich.
No Drawing. Filed June 1, 1971, Ser. No. 148,996
Int. Cl. C07d *105/02*
U.S. Cl. 260—543 P    2 Claims

ABSTRACT OF THE DISCLOSURE

A conjugated diene, a member of the group consisting of phosphorus trichloride, phosphorus tribromide and phosphorus triiodide and a hydrocarbyl phosphine are reacted at a temperature of from about 20° C. to reflux in the presence of a compound which will inhibit polymerization of the diene reactant; to prepare the corresponding 1-halophospholenes. The products of the process are for the most part novel compounds, useful as intermediates in the preparation of selective solvents and catalysts for the preparation of carbodiimides from isocyanates.

BACKGROUND OF THE INVENTION (1) Field of the invention

The invention is concerned with a process for preparing novel heterocyclic phosphorus compounds and is more particularly concerned with a process for the preparation of 1-halophospholenes by reaction of a conjugated diene with a phosphorus trihalide.

(2) Description of the prior art

Processes for preparing 1-halophospholene compounds were not known prior to our invention. Subsequent to our invention, a process was described (Quin et al., J. Am. Chem. Soc., 92; 5779, (1970); Myers et al. J. Org. Chem., 36, 1285–90) for the preparation of 1-halophospholenes.

By the process of our invention, the desired 1-halophospholene compounds are prepared in one step, directly from the corresponding conjugated diene.

SUMMARY OF THE INVENTION

The invention comprises a process which comprises reacting in the presence of an inert organic solvent, (A) a conjugated diene capable of undergoing the Diels-Alder reaction;
(B) a phosphorus trihalide selected from the group consisting of phosphorus trichloride, phosphorus tribromide and phosphorus triiodide; and
(C) a hydrocarbyl phosphine;

at a temperature of about 20° C. to reflux temperature in the presence of a compound which will inhibit the polymerization of said conjugated diene (A); to obtain the corresponding 1-halophospholene.

The term "hydrocarbyl" as used in this specification and claims means the monovalent moiety obtained upon removal of a hydrogen atom from a hydrocarbon. Illustrative of hydrocarbyl are alkyl groups such as methyl, ethyl, propyl, butyl, pentyl, hexyl, heptyl, octyl, nonyl, decyl, undecyl, dodecyl and the isomeric forms thereof; alkenyl groups such as vinyl, allyl, butenyl, pentenyl, hexenyl, heptenyl, octenyl, nonenyl, decenyl, undecenyl, dodecenyl and isomeric forms thereof; aryl groups such as phenyl, o-tolyl, m-tolyl, p-tolyl, p-ethylphenyl, xylyl, diphenylyl, naphthyl and the like; aralkyl groups such as benzyl, p-methylbenzyl, phenylethyl, phenylbutyl, phenylhexyl and the like.

The products of the process are for the most part novel compounds, useful as intermediates in a variety of syntheses. For example, the products of the process may be used in preparing selective solvents and in obtaining catalysts for the preparation of carbodiimides from isocyanates. Methods of preparing useful compounds from the novel products of the process are discussed in more detail hereinafter.

DETAILED DESCRIPTION OF THE INVENTION

The conjugated diene reactant employed in the process of the reaction may be any of those conjugated dienes which will undergo the well known Diels-Alder reaction. Such dienes are discussed in the text Newer Methods of Preparative Organic Chemistry by Kurt Alder, Interscience Publishers Inc. (1948), in the chapter, "The Diene Synthesis" beginning on page 331. A brief discussion of such conjugated dienes may also be found in U.S. Patent 2,663,737. Preferred dienes employed in the process of the invention are those having the general formula:

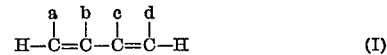

(I)

wherein *a*, *b*, *c* and *d* are each selected from the group consisting of hydrogen, halogen, alkoxy of 1 to 6 carbon atoms, inclusive, phenoxy, hydrocarbyl and halogen substituted hydrocarbyl; said hydrocarbyl having 1 to 6 carbon atoms inclusive.

The term "halogen" is used throughout this specification and claims in its generally accepted sense as embracing chlorine, bromine, iodine and fluorine.

The term "halogen substituted hydrocarbyl" means those hydrocarbyl groups as before defined wherein from one to all of the hydrogen atoms have been replaced by halogen as defined above. Illustrative of halogen substituted hydrocarbyl are chloromethyl, trichloromethyl, 2-chloroethyl, 2-bromoethyl, 1-chlorobutyl, 2-bromohexyl, 2-chlorobutenyl, 1,1,1-trifluorohexenyl, p-chlorophenyl, 2,5-diiodophenyl and the like.

The term "alkoxy of 1 to 6 carbon atoms, inclusive" means the radical represented by the formula —O—E wherein E is alkyl of 1 to 6 carbon atoms, inclusive, as defined above. Illustrative of alkoxy of 1 to 6 carbon atoms, inclusive, are methoxy, ethoxy, propoxybutoxy, pentyloxy and hexyloxy including isomeric forms thereof;

Conjugated dienes of Formula I are, for the most part, wel-known compounds. They may be prepared by a variety of well-known methods, illustrated for example by the method of Makin et al., Zhur. Obschchei Khim., vol. 30, pp. 3276–80 (1960) and those methods discussed in E. H. Rodd, Elsevier Publishing Co., N.Y., (1951) vol. II, pages 267–9. The halogenated conjugated dienes may be prepared by substitution halogenation of the corresponding non-halogenated compound using known methods; see, for example, E. H. Rodd, supra, pages 274–84.

Mixtures of conjugated dienes as above defined may also be employed in the process of the invention to prepare the corresponding mixture of 1-halophospholenes. It is also not necessary that the conjugated dienes used in the process of the invention have any particular degree of purity. For example, crude mixtures of such conjugated dienes are obtainable as by-products in the commercial cracking of gas oil. Such mixtures generally contain impurities comprising non-conjugated dienes, alkenes, alkanes and the like. Such crude starting mixtures may be employed in the process of the invention, and the 1-halophospholene products are then obtained in a corresponding crude mixture, from which they may be isolated by distillation, countercurrent extraction, chromatographic and like techniques.

The hydrocarbyl phosphines employed as reactants in the process of the invention are derivatives of phosphine wherein from 1 to 3 hydrogen atoms have been replaced by a hydrocarbyl group. Preferably, the hydrocarbyl group substituent has from 1 to 12 carbon atoms, inclusive.

Hydrocarbyl phosphines can be represented by the formula:

wherein $R_1$, $R_2$ and $R_3$ are each hydrocarbyl as defined above. $R_1$ and $R_2$ can also be hydrogen, in the Formula II and are preferably hydrogen when $R_3$ is a hydrocarbyl of 12 carbon atoms or more.

Hydrocarbyl phosphines are well known in the art, as is their preparation. Representatives of hydrocarbyl phosphines are methylphosphine, butylphosphine, octylphosphine, phenylphosphine, p - ethylphenylphosphine, benzylphosphine, 2,4,6-trimethylphenylphosphine, dimethylphenylphosphine, dimethylphosphine, dioctylphosphine, diphenylphosphine, di - 2,5 - xylylphosphine, diphenethylphosphine, dibenzylphosphine, dinaphthylphosphine, trimethylphosphine, trioctylphosphite, diethylphenylphosphine, dibenzylbutylphosphine, tri - p - tolylphosphine, tri - 2,5 - xylylphosphine, tribenzylphosphine, triphenethylphosphine, tri(2 - phenylphenyl)phosphine, benzylbutyl - p - tolylphosphine, diethylnaphthylphosphine, triallylphosphine, diallylphenylphosphine and the like. Methods for the preparation of hydrocarbyl phosphines are found in the text Organophosphorus Compounds, Kosolapoff, John Wiley & Sons Pub. Inc. New York, New York (1950), Chapter 2.

Using the Formula I as an illustration of those conjugated dienes which may be empoyed in the process of the invention, and the Formula II as representative of a hydrocarbyl phosphine, the course of the reaction may be represented schematically by the equation:

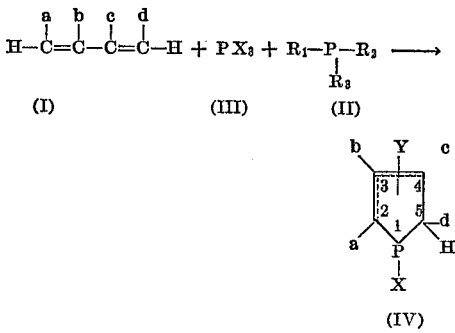

wherein $a$, $b$, $c$, $d$, $R_1$, $R_2$ and $R_3$ are as defined above; X is representative of chlorine, bromine, and iodine; the dotted line indicates that a double bond is located between the carbon at position 3 and one of the two carbons at positions 2 and 4; Y is hydrogen and is attached to whichever of the carbon atoms at positions 2 and 4 is not part of said double bond.

The products of the process are 1-halophospholenes, as illustrated by compounds of the Formula IV in the above equation. The dotted line is present in Formula IV to show that the product compounds of the process can exist in two structural isomeric forms; that is the 2-phospholene, wherein the double bond is located between carbon atoms 2 and 3, and the 3-phospholene wherein the double bond is located between carbon atoms 3 and 4. Reference hereafter to the 1-halophospholene compounds prepared by the process of the invention is intended to embrace both the 2- and the 3-isomeric forms unless otherwise stated, herein.

Under certain conditions of the process of the invention to be described hereinafter, both isomeric forms are obtainable in admixture. Both isomeric forms are useful, and for many purposes may be used in admixture. When desired, however, they are readily separated by conventional techniques such as fractional distillation, chromatographic separation, countercurrent extraction and like techniques.

The process of the invention is carried out by admixing substantially equimolar proportions of the conjugated diene reactant with the phosphorus trihalide (III) and phosphine (II) in an inert organic solvent, and in the presence of a compound which will inhibit polymerization of the diene reactant. The reaction is assisted by continually stirring the reaction mixture during the course of reaction. Conventional apparatus and techniques for mixing may be used in the process. An inert organic solvent as used in the process of the invention is one which does not itself enter into reaction with any of the reactants or otherwise interfere with the desired course of the reaction. Examples of such inert solvents are the aliphatic hydrocarbons such as n-hexane and cyclohexane; aromatic hydrocarbons such as benzene, toluene, xylene and the like. Preferred as the inert solvent in the process of the invention are the chlorinated hydrocarbons such as methylene chloride, chloroform, carbon tetrachloride, 1,2-dichloroethane, chlorobenzene, and the like. The solvent is employed in quantities sufficient to provide a concentration of the conjugated diene reactant in the initial reaction mixture of about 5 percent to about 95 percent by weight of reaction mixture. Preferably, the concentration of diene in the initial reaction mixture is from about 20 percent to about 80 percent by weight of reaction mixture.

It is necessary that there be present in the reaction mixture, a compound which will inhibit polymerization of the diene reactant. Such compounds are well known and readily available; see for example, U.S. Pats. 2,663,736; 2,663,737, Belgian Pat. 631,416; and McCormack, Org. Syn. vol. 43, p. 73, (1963). Examples of such inhibitors are methylene blue, rhodamine, phenothiazine, N-phenyl-1-phenylazo-2-naphthanilamine, 2,6-di-tert-butyl-p-cresol; copper salts such as copper stearate, copper naphthenate, cuprous chloride and cuprous iodide; polynitro compounds such as trinitrobenzene, dinitrobenzene, and trinitrotoluene and the like. Generally the proportion of polymerization inhibitor used is from about 0.1 percent to about 2.0 percent based on weight of the reaction mixture.

Although the process is ordinarily carried out at atmospheric pressure, higher pressures will assist reaction, particularly when the diene reactant has bulky side chain substituents or when the boiling point of the diene reactant is lower than or coincides with the temperature employed in carrying out the process of the invention.

Although the process may be carried out at temperatures of about 20° C. to reflux temperature, it is preferable to heat the reaction mixture to a temperature of from about 40° C. to reflux temperature to increase the rate of reaction.

When the process is carried out at a temperature of about 20° C. to about 40° C., the 1-halophospholene product obtained is the 3-phospholene isomer, substantially free of the corresponding 2-phospholene isomer.

When the process is carried out under the preferred temperature conditions, that is at the temperature range of about 40° C. to reflux temperature, the 3-phospholene isomer product compounds as illustrated by the formula (IV) are generally observable in the reaction mixture within about 0.5–1 hour. When this thermally promoted reaction which is a preferred embodiment within the scope of the process of the invention is terminated within about 1 to 2 hours of heating, the product obtained is the 1-halo-3-phospholene substantially free of the corresponding 2-phospholene isomer. When the reaction is permitted to continue under the preferred temperature conditions for longer periods. The product is a mixture of 1 - halo - 3 - phospholene and 1-halo - 2 - phospholene isomers.

The relative proportions of the two isomers obtained under the conditions of the process resulting in a mixture of isomers as discussed above appears to be dependent upon the nature of the substituents a, b, c, d and X as well as upon the length of time heat is applied to the reaction mixture.

The 1-halophospholene products of the process are generally susceptible to oxidation upon exposure to the atmosphere, particularly when heated. The recoverable yields are therefore increased when the reaction is carried out under an inert gas atmosphere. Illustrative of an inert gas which can be used is nitrogen, using conventional apparatus and techniques.

The recoverable product yields are also enhanced when the process is carried out under anhydrous conditions, that is by employing dried reactants and excluding moisture during the course of the reaction and subsequent product purifications.

The progress of the reaction may be followed by conventional analytical methods such as infrared spectral analysis, vapor phase chromatography and nuclear magnetic resonance analysis. Using the latter method for example, formation of the desired products can be observed by the appearance of appropriate chemical shifts and coupling constants corresponding to the products of the process as illustrated by the Formula IV.

A readily observable visual indication that the reaction is complete is the cessation of phosphonium halide by-product precipitation in the reaction mixture, when that salt is insoluble in the particular solvent employed.

Upon completion of the reaction, the 1-halophospholene product compounds are separated from the reaction mixture by conventional techniques. For example, the reaction mixture can be subjected to filtration, centrifugation, and like techniques to remove insoluble materials. The product compounds can then be isolated from the remaining solution in pure form by conventional techniques such as by distillation, countercurrent extraction, chromatographic separation and like methods.

The system of nomenclature followed by this specification and claims is illustrated by the following examples:

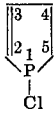     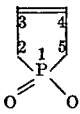

1-chloro-2-phospholene     1-methoxy-3-phospholene-1-oxide

The following examples describe the manner and process of making and using the invention, and set forth the best mode contemplated by the inventors of carrying out the invention, but are not to be construed as limiting.

EXAMPLE 1

A reaction flask is charged with 200 ml. of chloroform, 24.8 gms. (0.46 mole) of 1,3-butadiene, 42.1 gms. (0.306 mole) of phosphorus trichloride, 0.5 gm. of copper stearate and 78.6 gms. (0.3 mole) of triphenylphosphine. The mixture is stirred and allowed to stand at room temperature for about 6 months. At the end of this period, the reaction mixture is filtered, and the filtrate distilled under a pressure of 10 mm. of mercury and that fraction which distills at a temperature of 41° C. is collected. There is thus obtained 1.82 gms. of 1-chloro-3-phospholene in the form of a colorless liquid having a boiling point of 41° C./10 mm. of Hg. The assigned structure of the product is confirmed by proton nuclear magnetic resonance analysis which shows $J_{PCH_2}$ 19.8 Hz. at $\delta$ 2.81 and $J_{PCCH}$ 6.5 Hz. at $\delta$ 5.94 (CDCl$_3$). The phosphorus chemical shift is $\delta$ P$^{31}$–117.6 (neat) relative to 85% phosphoric acid.

EXAMPLE 2

A reaction flask is charged with 0.5 gm. of copper stearate, 100 ml. of chloroform, 23.2 gms. (0.282 moles) of 2,3-dimethyl-1,3-butadiene, 24.6 ml. (0.282 moles) of phosphorus trichloride and 73.9 gms. of triphenylphosphine. The mixture is continually stirred at room temperautre for about 17 hours. At the end of this period the reaction mixture comprises a clear yellow solution containing a cream colored solid precipitate. An aliquot of the supernatant solution is subjected to proton nuclear magnetic resonance analysis and the presence of 1-chloro-3,4-dimethyl-3-phospholene confirmed by the showing of the characteristic $J_{PCH_2}$ 19.0 Hz. at $\delta$ 2.75 (CHCl$_3$).

The desired 1-chloro-3,4-dimethyl-3-phospholene is separated from the reaction mixture by filtration and distillation of the filtrate at a temperature of about 63° C. to 65° C. and under a pressure of about 7.0 mm. of mercury.

Similarly, following the above procedure, but replacing the phosphorus trichloride with an equal molar proportion of phosphorus tribromide or an equal molar proportion of phosphorus triiodide, there are obtained 1-bromo-3,4-dimethyl-3-phospholene and 1-iodo-3,4-dimethyl-3-phospholene, respectively.

EXAMPLE 3

A round bottom flask is charged with 100 ml. of 1,2-dichloroethane and 0.25 gm. of copper stearate. To this mixture there is added with stirring 35 ml. (0.35 mole) of isoprene, 65.5 gms. 0.25 mole) of triphenylphosphine and then 22 ml. (0.25 mole) of phosphorus trichloride. The resulting mixture is refluxed for 5 and ½ hours while being continually stirred, and then allowed to stand overnight at room temperature. The reaction mixture is then stripped of solvent and other volatiles by distillation at a temperature of 25° C. and under a pressure of 15 mm. of Hg, and the distillation residue is distilled at a temperature of 25° C. to 43° C. under a pressure of 12 mm. to 15 mm. of mercury. The second distillate (16.7 gms.) is found by proton nuclear magnetic resonance analysis to contain 73.1 percent by weight (36.3 percent of theory) of a mixture of 1-chloro-3-methyl-2-phospholene and 1-chloro-3-methyl-3-phospholene. The relative proportions of the two isomers is 77 percent by weight of the 3-phospholene and 23 percent by weight of the 2-phospholene isomer. The assigned structure of the products is confirmed by proton nuclear magnetic resonance analysis which shows the characteristic $J_{PCH_2}$ 19.0 Hz. at $\delta$ 2.70 (neat) for the 3-phospholene isomer and $J_{PCH}$ 46.2 Hz. at $\delta$ 6.00 (neat) for the 2-phospholene isomer. The desired phospholenes are separated from the crude distillate by fractional distillation at a temperature of 52° C. to 60° C. and under a pressure of 8.0 mm. of mercury to give pure 1-chloro-3-methyl-3-phospholene, boiling point 53° C./8.0 mm. of Hg and pure 1-chloro-3-methyl-2-phospholene, boiling point 64° C./9.0 mm. of Hg.

Similarly, following the above procedure but replacing the triphenylphosphine as used therein with an equal molar proportion of one of the following compounds of Formula II: methylphosphine, butylphosphine, octylphosphine, phenylphosphine, p-ethylphenylphosphine, benzylphosphine, dimethylphosphine, dioctylphosphine, dinaphthylphosphine, di-2,5-xylylphosphine, diphenethylphosphine, dibenzylphosphine, trimethylphosphine trioctylphosphine, diethylphenylphosphine, dibenzylbutylphosphine, tri-p-tolylphosphine, tri-2,5-xylylphosphine, tribenzylphosphine, triphenethylphosphine, benzylbutyl-p-tolylphosphine or triallylphosphine there is obtained in each instance a mixture of 1-chloro-3-methyl-2-phospholene and 1-chloro-3-methyl-3-phospholene.

EXAMPLE 4

A round bottom flask is charged with 35 ml. (0.35 mole) of isoprene, 22 ml. (0.25 mole) of phosphorus trichloride, 65.5 gms. (0.25 mole) of triphenylphosphine, 0.5 gm. of copper stearate and 100 ml. of 1,2-dichloroethane. The mixture is refluxed for 3 hours while being continually stirred, and then allowed to stand for about 65 hours at room temperature. The reaction mixture is then distilled at a temperature of 45° C. and under a pressure 9.0 mm. of mercury to give 17.6 gms. of a distillate which is found by proton nuclear magnetic resonance analysis to contain 64.5 percent by weight of a mixture of 1-chloro-3-methyl-2-phospholene and 1-chloro-3-methyl-3-phospholene. The relative proportions of the two isomers is 88.7 percent by weight of the 3-phospholene and 11.3 percent by weight of the 2-phospholene isomer. The distillation residue is found to contain an additional 0.8 gm. of the mixed isomer product, for a total yield of 12.15 gms. (36 percent of theory). The assigned structure of the phospholene products is confirmed by proton nuclear magnetic resonance analysis which shows the characteristic $J_{PCH_2}$ 19.0 Hz. at $\delta 2.71$ (neat) for the 3-phospholene isomer and $J_{PCH}$ 46.2 Hz. at $\delta 6.00$ (neat) for the 2-phospholene isomer. The desired phospholenes are separated from the crude distillate by fractional distillation at a temperature of 46° C. to 53° C. and under a pressure of 7.0 mm. of mercury. The isomers are separated from each other by fractional distillation, the 2-phospholene having a boiling point of 64° C./9.0 mm. of Hg and the 3-phospholene having a boiling point of 53° C./8.0 mm. of Hg.

Similarly, following the above procedure but replacing the 2-methyl-1,3-butadiene as used therein with an equal molar proportion of:

1,3-butadiene
2-chloro-1,3-butadiene
1,2,3,4-tetrabromo-1,3-butadiene,
2-(4-chloro-4-methylpentyl)-1,3-butadiene,
1,3,5-hexatriene,
7-methyl-3-methylene-1,6-octadiene,
2-methoxy-1,3-butadiene,
4-isopentoxy-1,3-butadiene,
4-phenoxy-1,3-butadiene,
2-phenyl-1,3-butadiene, or
2-o-chlorophenyl-1,3-butadiene, there are obtained the following mixtures of corresponding 1-chlorophospholenes:

1-chloro-2-phospholene and 1-chloro-3-phospholene;
1,3-dichloro-2-phospholene and 1,3-dichloro-3-phospholene;
1-chloro-2,3,4,5-tetrabromo-2-phospholene and 1-chloro-2,3,4,5-tetrabromo-3-phospholene;
1-chloro-3-(4-chloro-4-methylpentyl)-2-phospholene and 1-chloro-3-(4-chloro-4-methylpentyl)-3-phospholene;
1-chloro-2-vinyl-2-phospholene and 1-chloro-2-vinyl-3-phospholene with 1-chloro-5-vinyl-2-phospholene and 1-chloro-5-vinyl-3-phospholene;
1-chloro-4-(4-methyl-3-pentenyl)-2-phospholene and 1-chloro-4-(4-methyl-3-pentenyl)-3-phospholene;
1-chloro-3-methoxy-2-phospholene and 1-chloro-3-methoxy-3-phospholene;
1-chloro-5-isopentoxy-2-phospholene and 1-chloro-5-isopentoxy-3-phospholene;
1-chloro-5-phenoxy-2-phospholene and 1-chloro-5-phenoxy-3-phospholene;
1-chloro-3-phenyl-2-phospholene and 1-chloro-3-phenyl-3-phospholene;
and a mixture of 1-chloro-3-o-chlorophenyl-2-phospholene and 1-chloro-3-o-chlorophenyl-3-phospholene, respectively.

The 1-halophospholene product compounds prepared by the process of the invention are for the most part novel compounds, useful as intermediates in a number of syntheses. Illustratively, following the procedure of Hasserodt et al., Tetrahedron, vol. 19, pp. 1563–75 (1963), for preparing phospholene-1-oxides; the 1-halo-phospholenes prepared by the process of the invention can be reacted with aliphatic alcohols such as methanol, ethanol, propanol butanol and the like or with phenol. The reaction is carried out in the presence of air and a tertiary amine acid acceptor such as a trialkylamine to give the corresponding 1-alkoxyphospholene-1-oxides, which compounds are useful as catalysts for converting isocyanates to the corresponding carbodiimides. For example, when 1-chloro-3-methyl-3-phospholene as obtained in Example 2 above is reacted with methanol in the presence of triethylamine and air, the product is 1-methoxy-3-methyl-3-phospholene-1-oxide, which is a known catalyst for preparing carbodiimides from isocyanates (Arbuzov et al., Doklady Akademii Nauk SSSR, vol. 170, No. 3 pp. 585–588, September 1966). Similarly, 1-chloro-3-methyl-2-phospholene as obtained in Example 2 may be reacted with methanol following the procedure of Hasserodt et al., supra, to prepare 1-methoxy-3-methyl-2-phospholene-1-oxide which is a selective solvent for the extraction of aromatics (see U.S. Pat. 3,345,287).

We claim:
1. The process which comprises reacting in an inert organic solvent,
   (A) 2,3-dimethyl-1,3-butadiene;
   (B) phosphorus trichloride;
   (C) a hydrocarbyl phosphine of the formula:

wherein $R_1$, $R_2$ and $R_3$ are each hydrocarbyl of 1 to 12 carbon atoms, inclusive, and additionally $R_1$ and $R_2$ can each be hydrogen;

at a temperature of about 20° C. to reflux temperature in the presence of a compound which will inhibit the polymerization of said diene (A); whereby the product obtained is 1-chloro-3,4-dimethyl-3-phospholene having the formula:

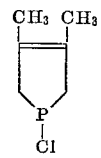

2. The process which comprises reacting in an inert organic solvent,
   (A) isoprene;
   (B) phosphorus trichloride;
   (C) a hydrocarbyl phosphine of the formula:

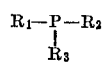

wherein $R_1$, $R_2$ and $R_3$ are each hydrocarbyl of 1 to 12 carbon atoms, inclusive, and additionally $R_1$ and $R_2$ can each be hydrogen;

in the presence of a compound which will inhibit the polymerization of said isoprene (A) and at a temperature of about 40° C. to reflux temperature for a time sufficient to obtain a mixture of 1-chloro-3-methyl-2-phospholene and 1-chloro-3-methyl-3-phospholene of the formulae:

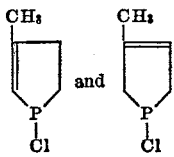

References Cited

FOREIGN PATENTS 1,011,974  12/1965  United Kingdom ___ 260—543 P
  210,155   2/1968  U.S.S.R. _____ 260—543 P

OTHER REFERENCES

Coggon et al. J.A.C.S., 92:19, September 1970, pp. 5779–80.

LORRAINE A. WEINBERGER, Primary Examiner

R. D. KELLY, Assistant Examiner

U.S. Cl. X.R.

260—936, 973